(12) United States Patent
Billard et al.

(10) Patent No.: US 11,597,631 B2
(45) Date of Patent: Mar. 7, 2023

(54) MAGNET ASSEMBLIES OF ELECTROMECHANICAL ACTUATORS FOR ELEVATOR SYSTEMS HAVING ENCAPSULATED SWITCH

(71) Applicant: Otis Elevator Company, Farmington, CT (US)

(72) Inventors: Justin Billard, Amston, CT (US); Yu Pu, Farmington, CT (US); Antonio Martins, Vernon, CT (US); Manuel Garcia Canales, Madrid (ES); Luis Martí Sánchez, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 115 days.

(21) Appl. No.: 17/323,394

(22) Filed: May 18, 2021

(65) Prior Publication Data
US 2022/0371856 A1 Nov. 24, 2022

(51) Int. Cl.
*B66B 1/36* (2006.01)
*H02K 49/04* (2006.01)
*B66B 5/18* (2006.01)

(52) U.S. Cl.
CPC ............ *B66B 1/36* (2013.01); *H02K 49/046* (2013.01)

(58) Field of Classification Search
CPC .... B66B 1/36; B66B 5/22; B66B 5/18; B66B 17/34; B66B 11/0293
See application file for complete search history.

(56) References Cited

U.S. PATENT DOCUMENTS

| | | | | |
|---|---|---|---|---|
| 7,398,863 B2 * | 7/2008 | Liebetrau | ............... | B66B 7/046 |
| | | | | 187/372 |
| 2008/0079521 A1 | 4/2008 | Maerky et al. | | |
| 2011/0308895 A1 * | 12/2011 | Shen | ........................ | B66B 5/18 |
| | | | | 187/359 |
| 2016/0289045 A1 * | 10/2016 | Osmanbasic | ......... | F16D 63/008 |
| 2020/0031621 A1 * | 1/2020 | Khzouz | ..................... | B66B 5/18 |

FOREIGN PATENT DOCUMENTS

| | | | | |
|---|---|---|---|---|
| CN | 110342367 A | * | 10/2019 | ............. B66B 5/044 |
| DE | 202019103423 U1 | * | 8/2019 | ............... B66B 5/18 |
| EP | 3566993 A1 | | 11/2019 | |
| WO | 2015191696 A1 | | 12/2015 | |

OTHER PUBLICATIONS

European Search Report for European Application No. 21210059.8, dated May 3, 2022, 6 pages.

* cited by examiner

*Primary Examiner* — Diem M Tran
(74) *Attorney, Agent, or Firm* — Cantor Colburn LLP

(57) ABSTRACT

Magnet assemblies of electromechanical assemblies for elevator systems are described. The magnet assemblies include a magnet, at least one rail engagement block, and an encapsulating body encapsulating the magnet and the at least one rail engagement block, wherein the encapsulating body is formed from a non-magnetic material. A target extension is formed from the material of the encapsulating body and extends away from the magnet and the at least one rail engagement block. A proximity switch target is held within the target extension for detection by a proximity switch.

20 Claims, 13 Drawing Sheets

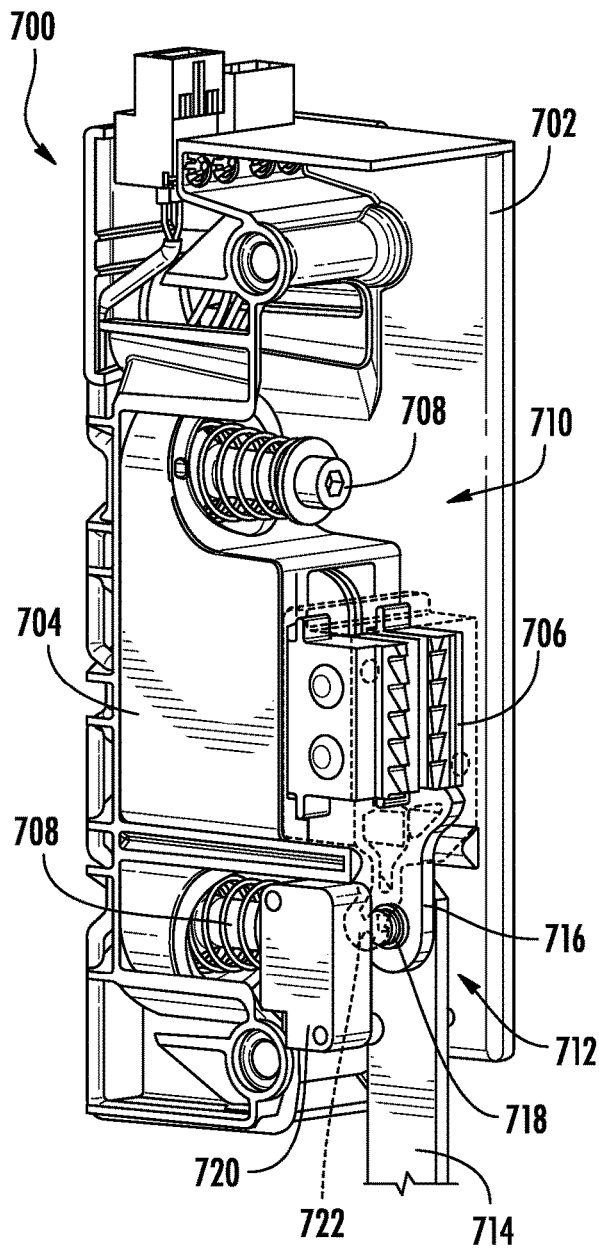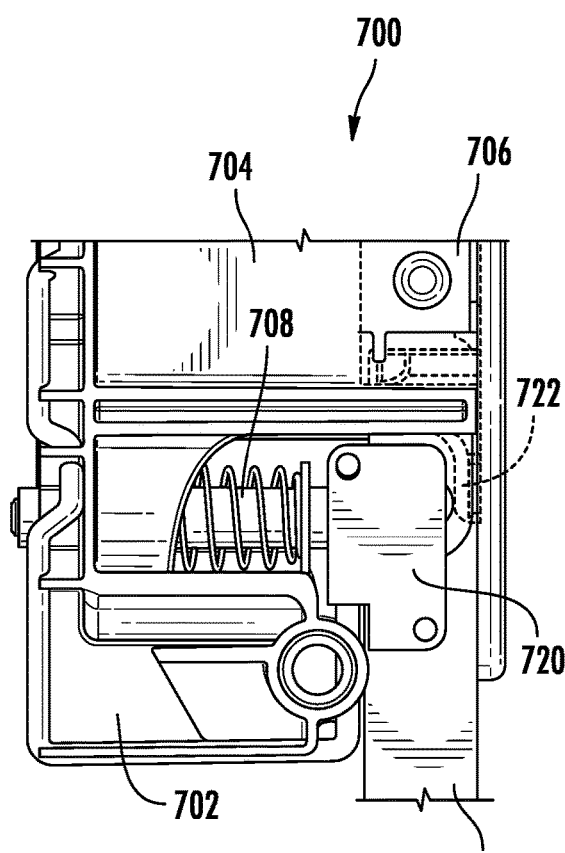
FIG. 7A
FIG. 7B

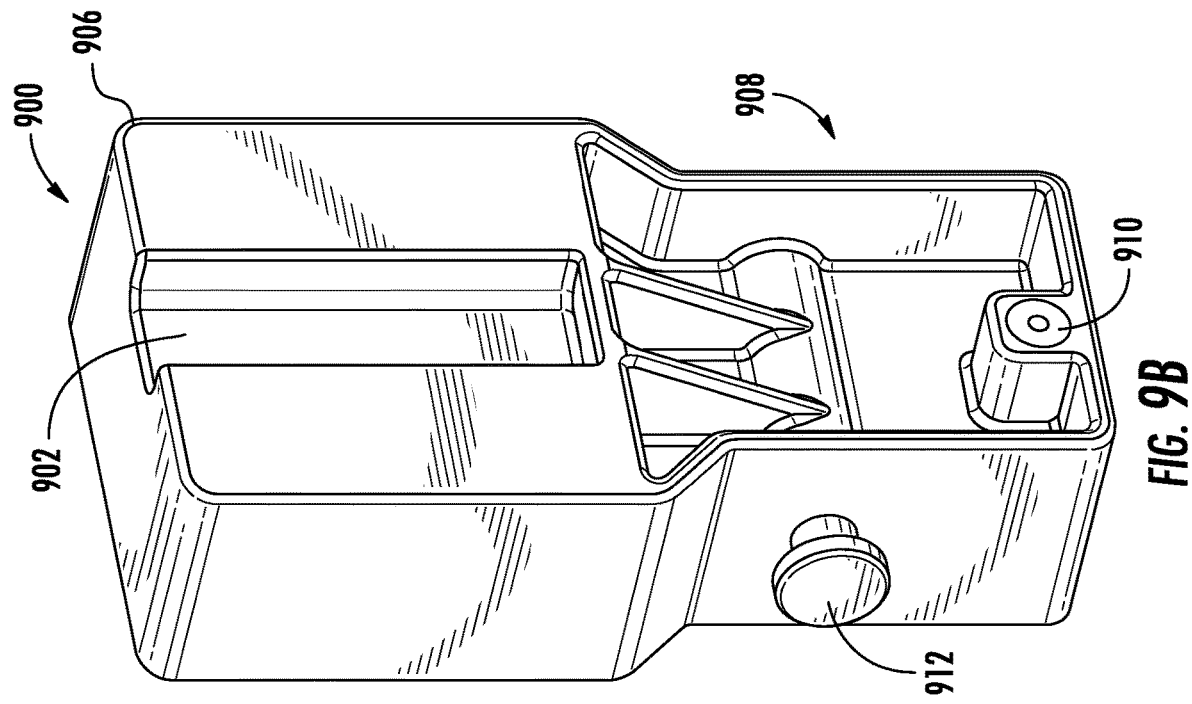
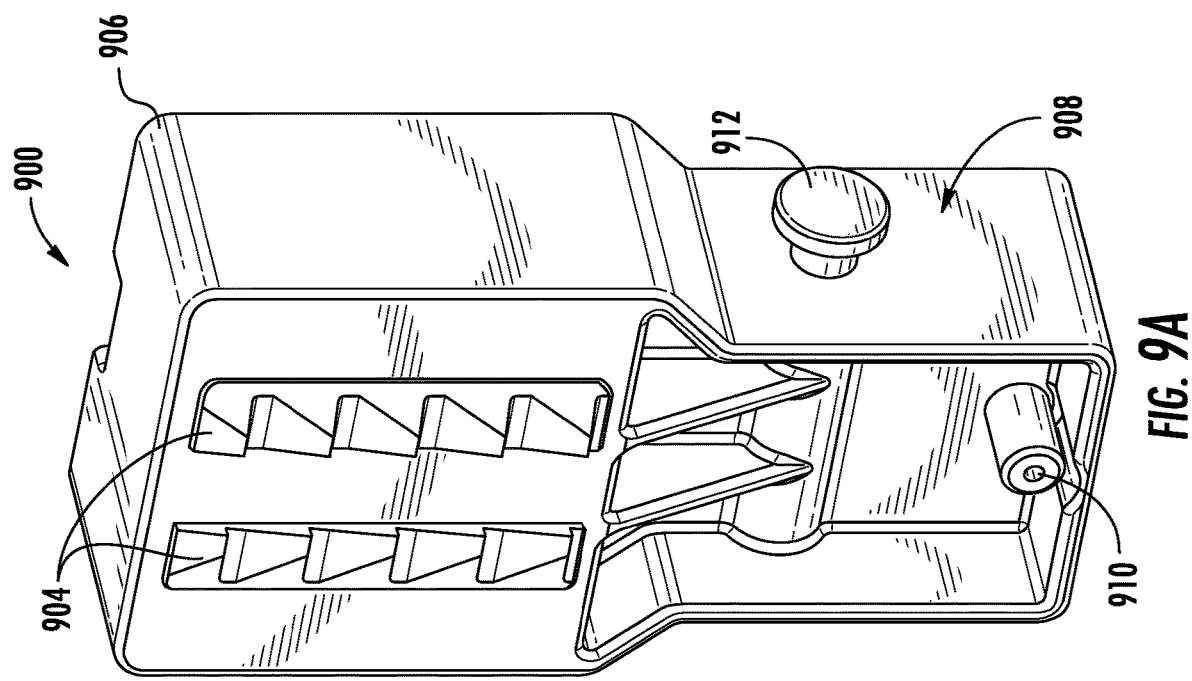

MAGNET ASSEMBLIES OF ELECTROMECHANICAL ACTUATORS FOR ELEVATOR SYSTEMS HAVING ENCAPSULATED SWITCH

BACKGROUND

Embodiments described herein relate to elevator brake assemblies and, more specifically, to elevator brakes with electromagnetic assemblies having magnet assemblies that are configured to engage with the electromagnet assemblies, the magnet assemblies having encapsulated switches.

Elevator systems may be configured with an electronic safety actuator as an alternative to the typical, centrifugal governor. In such electronic safety actuators, a bi-stable magnetic actuator is used to engage the safeties, and thus enable stopping of an elevator car. The safety actuators include magnet assemblies that are configured to provide a friction interface to generate a braking force when activated and engaged with a guide rail of an elevator system. It may be advantageous to provide improved magnet assemblies that may have increased life, lower costs, and/or high braking force.

BRIEF SUMMARY

In accordance with some embodiments, magnet assemblies of electromechanical assemblies for elevator systems are provided. The magnet assemblies include a magnet, at least one rail engagement block, an encapsulating body encapsulating the magnet and the at least one rail engagement block, wherein the encapsulating body is formed from a non-magnetic material, a target extension formed from the material of the encapsulating body and extending away from the magnet and the at least one rail engagement block, and a proximity switch target held within the target extension.

In addition to one or more of the features described above, or as an alternative, further embodiments of the magnet assemblies may include that the material of the encapsulating body is plastic.

In addition to one or more of the features described above, or as an alternative, further embodiments of the magnet assemblies may include that the at least one rail engagement block is two rail engagement blocks arranged on opposite sides of the magnet.

In addition to one or more of the features described above, or as an alternative, further embodiments of the magnet assemblies may include that the at least one rail engagement block comprises a plurality of teeth.

In addition to one or more of the features described above, or as an alternative, further embodiments of the magnet assemblies may include a magnet assembly extension configured to operably connect to a connecting rod of an electromechanical actuator.

In addition to one or more of the features described above, or as an alternative, further embodiments of the magnet assemblies may include at least one fastener configured to attach the magnet assembly extension to the at least one rail engagement block.

In addition to one or more of the features described above, or as an alternative, further embodiments of the magnet assemblies may include that the target extension is configured to position the proximity switch target at least 10 mm from the magnet.

In addition to one or more of the features described above, or as an alternative, further embodiments of the magnet assemblies may include that the proximity switch target is formed from steel.

In addition to one or more of the features described above, or as an alternative, further embodiments of the magnet assemblies may include a connector pin configured to engage with a connecting rod to enable actuation of a safety brake.

In addition to one or more of the features described above, or as an alternative, further embodiments of the magnet assemblies may include that the connector pin is housed within the encapsulating body.

According to some embodiments, electromechanical actuators of elevator systems are provided. The electromechanical actuators include a housing, an electromagnet assembly moveably mounted within the housing, and a magnet assembly moveably mounted within the housing and configured to magnetically engage and disengage from the electromagnet assembly. The magnet assembly includes a magnet, at least one rail engagement block, an encapsulating body encapsulating the magnet and the at least one rail engagement block, wherein the encapsulating body is formed form a non-magnetic material, a target extension formed from the material of the encapsulating body and extending away from the magnet and the at least one rail engagement block, and a proximity switch target held within the target extension.

In addition to one or more of the features described above, or as an alternative, further embodiments of the electromechanical actuators may include that the material of the encapsulating body is plastic.

In addition to one or more of the features described above, or as an alternative, further embodiments of the electromechanical actuators may include that the at least one rail engagement block is two rail engagement blocks arranged on opposite sides of the magnet.

In addition to one or more of the features described above, or as an alternative, further embodiments of the electromechanical actuators may include that the at least one rail engagement block comprises a plurality of teeth.

In addition to one or more of the features described above, or as an alternative, further embodiments of the electromechanical actuators may include a magnet assembly extension configured to operably connect to a connecting rod of an electromechanical actuator.

In addition to one or more of the features described above, or as an alternative, further embodiments of the electromechanical actuators may include at least one fastener configured to attach the magnet assembly extension to the at least one rail engagement block.

In addition to one or more of the features described above, or as an alternative, further embodiments of the electromechanical actuators may include a connecting rod attached to the magnet assembly extension at a first end and a safety brake at a second end.

In addition to one or more of the features described above, or as an alternative, further embodiments of the electromechanical actuators may include at least one guide, wherein the electromagnet assembly is moveably mounted on the at least one guide.

In addition to one or more of the features described above, or as an alternative, further embodiments of the electromechanical actuators may include a proximity switch, wherein the proximity switch is mounted on an end of the at least one guide and wherein the proximity switch is configured to detect the presence of the proximity switch target.

In addition to one or more of the features described above, or as an alternative, further embodiments of the electromechanical actuators may include a proximity switch fixedly positioned within the housing and wherein the proximity switch is configured to detect the presence of the proximity switch target.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 7A is an isometric illustration of an electromechanical actuator in accordance with an embodiment of the present disclosure;

FIG. 7B is an enlarged illustration of a portion of the electromechanical actuator of FIG. 7A;

FIG. 9A is a schematic illustration of an encapsulated magnet assembly in accordance with an embodiment of the present disclosure;

FIG. 9B is an alternative view of the encapsulated magnet assembly of FIG. 9A;

DETAILED DESCRIPTION

Figure 1:
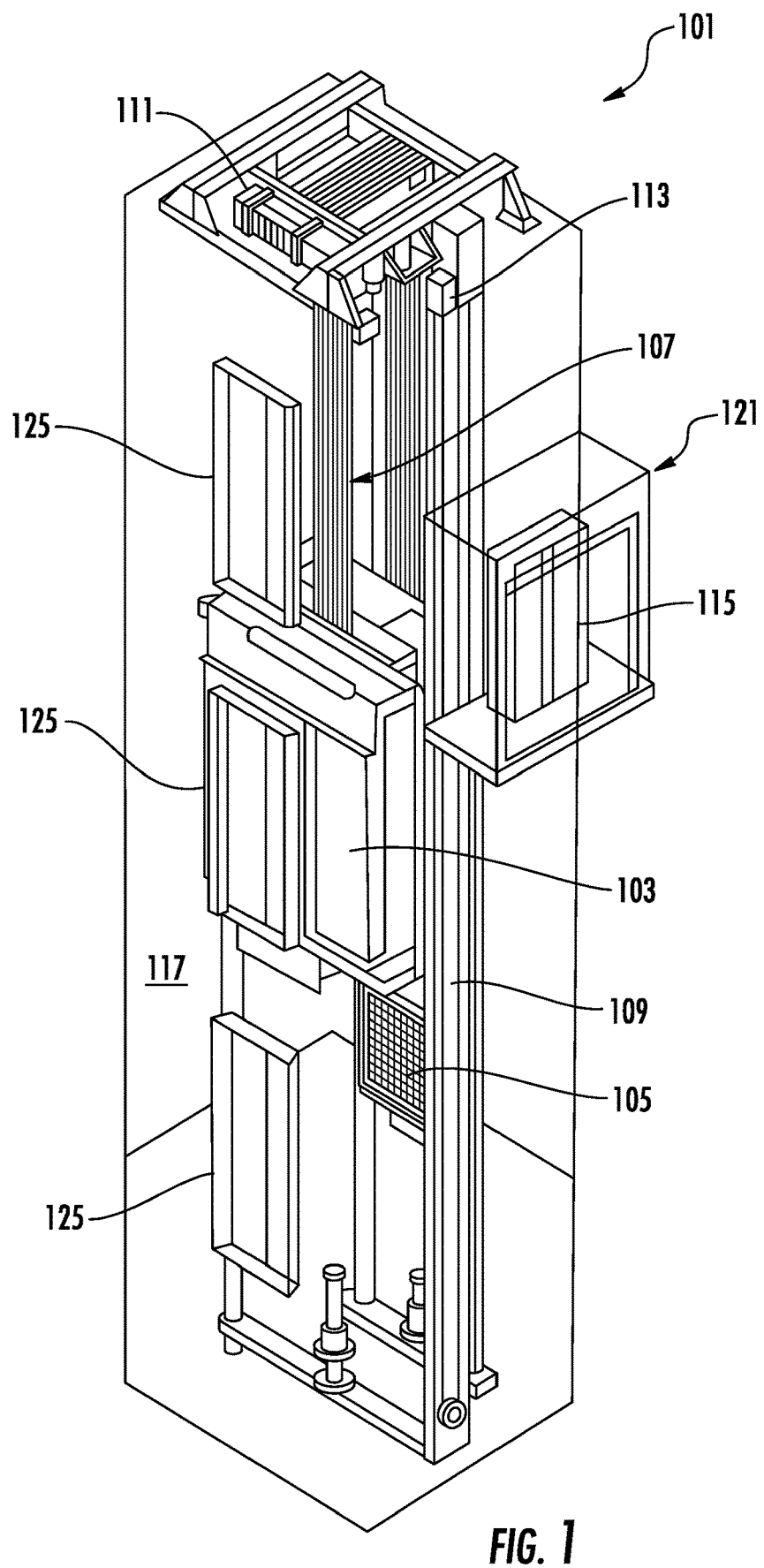
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter-weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
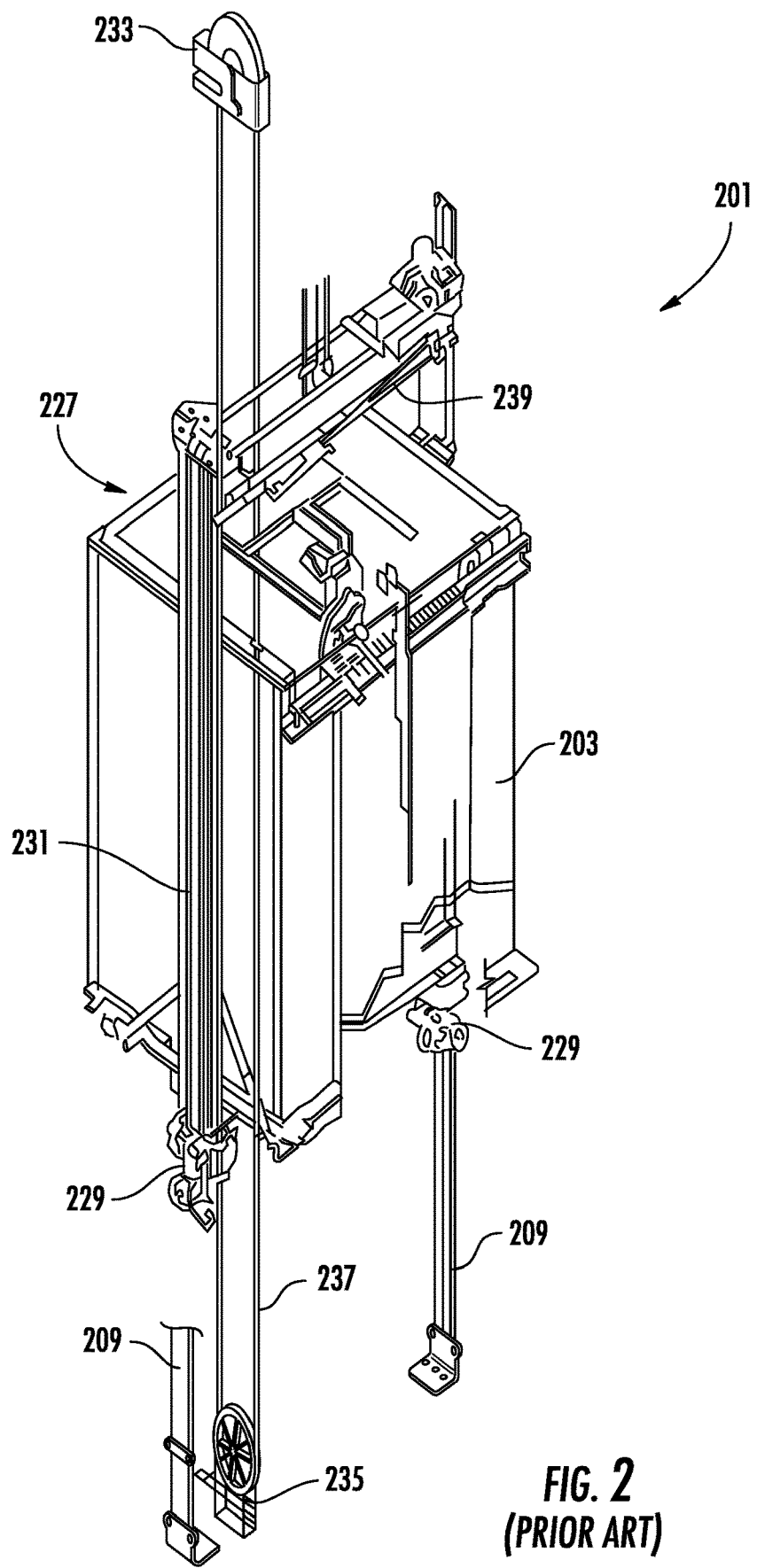
FIG. 2 is a prior art arrangement of an overspeed safety system for elevators.

Turning to FIG. 2, a schematic illustration of a prior elevator car overspeed safety system 227 of an elevator system 201 is shown. The elevator system 201 includes an elevator car 203 that is movable within an elevator shaft along guide rails 209. In this illustrative embodiment, the overspeed safety system 227 includes a pair of braking elements 229 that are engageable with the guide rails 209. The braking elements 229 are actuated, in part, by operation of lift rods 231. The triggering of the braking elements 229 is achieved through a governor 233, typically located at the top of the elevator shaft, which includes a tension device 235 located within the pit of the elevator shaft with a cable 237 operably connecting the governor 233 and the tension device 235. When an overspeed event is detected by the governor, the overspeed safety system 227 is triggered, and a linkage 239 is operated to actuate a combination of lift rods 231 simultaneously to cause actuation (e.g., self-engagement) of the braking elements 229 (e.g., safety wedges) that engage with the guide rail and cause a smooth and even stopping or braking force to stop the travel of the elevator car. As used herein the term "overspeed event" refers to an event during which a speed, velocity, or acceleration of an elevator car exceeds a predetermined threshold of the respective state of motion, and is not intended to be limited to constant speed, but rather also includes rates of change (e.g., acceleration) and also direction of travel of motion the elevator car (e.g., velocity). The linkage 239, as shown, is located on the top of the elevator car 203 and ensures simultaneous operation of the braking elements 229. However, in other configurations, the linkage may be located below a platform (or bottom) of the elevator car. As shown, various components are located above and/or below the elevator car 203, and thus pit space and overhead space within the elevator shaft must be provided to permit operation of the elevator system 201.

Figure 3A:
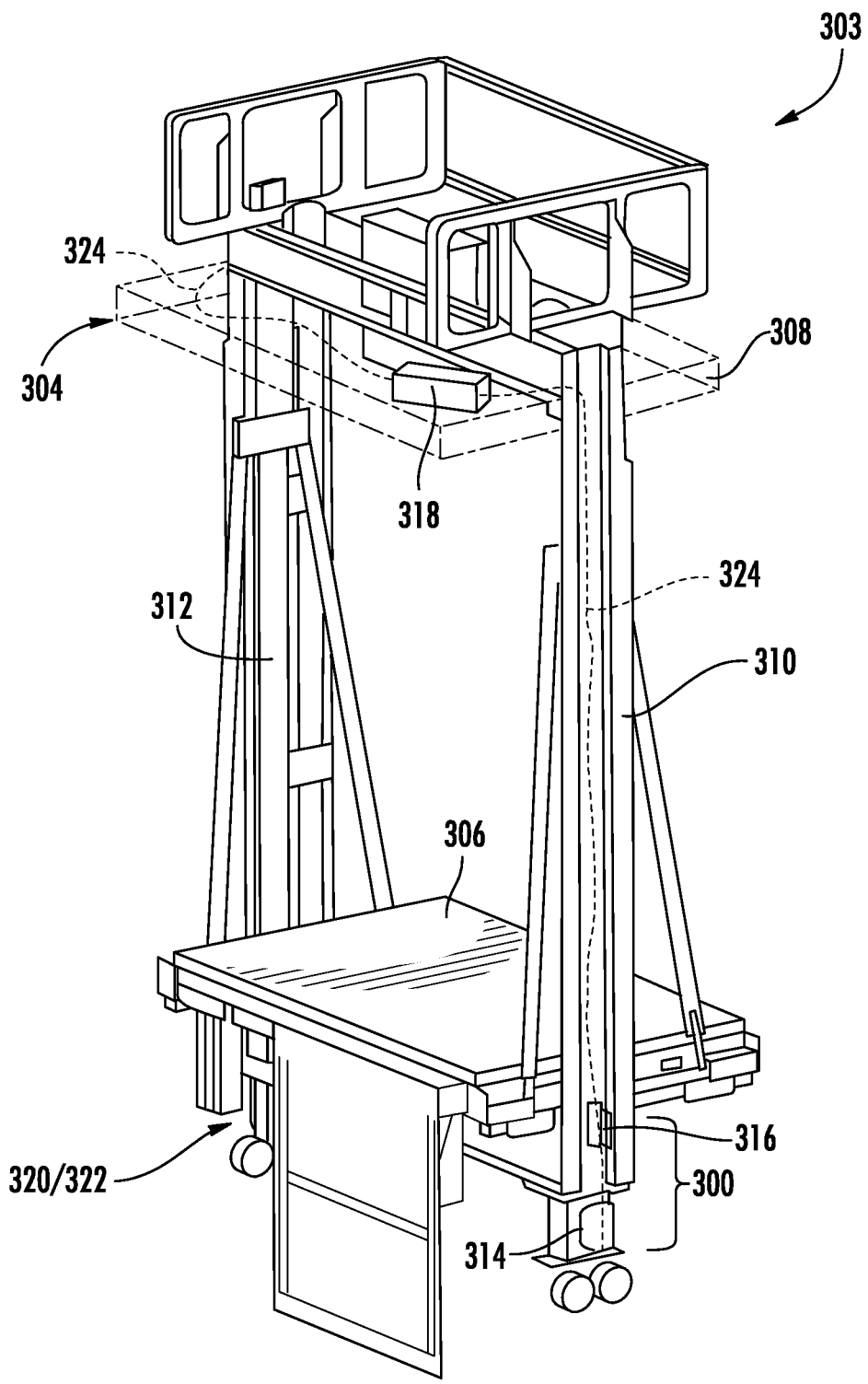
FIG. 3A is an isometric illustration of an elevator car frame having an overspeed safety system in accordance with an embodiment of the present disclosure.
Figure 3B:
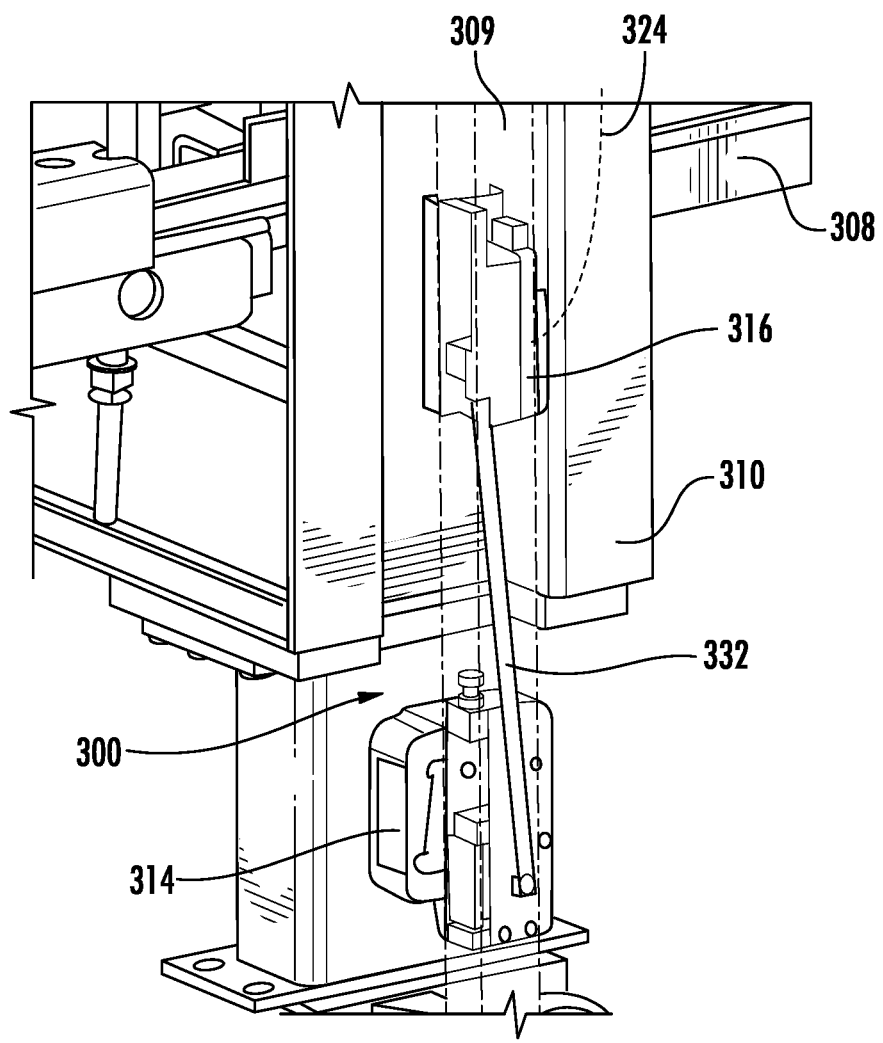
FIG. 3B is an enlarged illustrative view of a portion of the overspeed safety system of FIG. 3A.
Figure 3C:
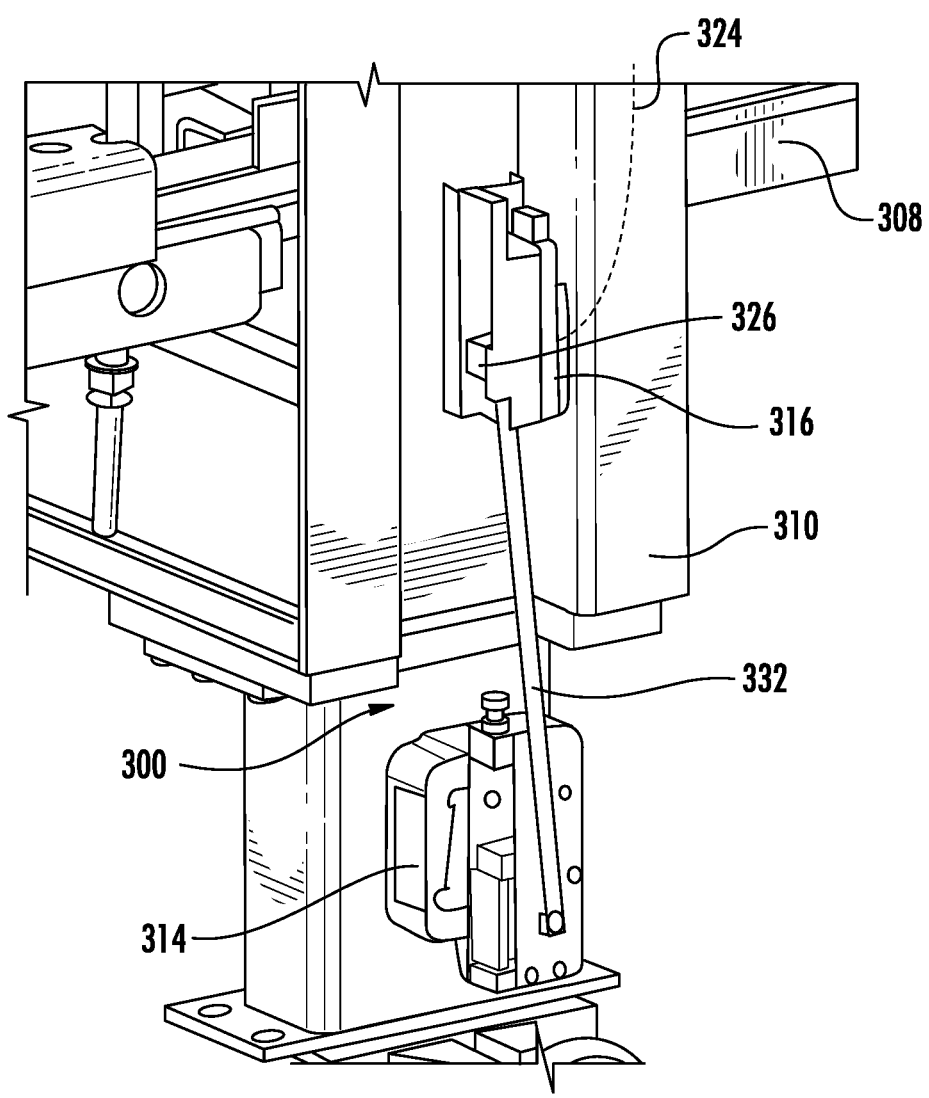
FIG. 3C is the same view as FIG. 3B, but with a guide rail removed for clarity.

Turning now to FIGS. 3A-3C, schematic illustrations of an elevator car 303 having an overspeed safety system 300 in accordance with an embodiment of the present disclosure are shown. FIG. 3A is an isometric illustration of an elevator car frame 304 with the overspeed safety system 300 installed thereto. FIG. 3B is an enlarged illustration of a portion of the overspeed safety system 300 showing a relationship with a guide rail. FIG. 3C is a schematic similar to FIG. 3B, but with the guide rail removed for clarity of illustration.

The car frame 304 includes a platform 306, a ceiling 308, a first car structural member 310, and a second car structural member 312. The car frame 304 defines a frame for supporting various panels and other components that define the elevator car for passenger or other use (i.e., define a cab of the elevator), although such panels and other components are omitted for clarity of illustration. The elevator car 303 is moveable along guide rails 309 (shown in FIG. 3B), similar to that shown and described above. The overspeed safety system 300 provides a safety braking system that can stop the travel of the elevator car 303 during an overspeed event.

The overspeed safety system 300 includes a first safety brake 314, a first electromechanical actuator 316, and a controller or control system 318 operably connected to the first electromechanical actuator 316. The first safety brake 314 and the first electromechanical actuator 316 are arranged along the first car structural member 310. A second safety brake 320 and a second electromechanical actuator 322 are arranged along the second car structural member 312. The control system 318 is also operably connected to the second electromechanical actuator 322. The connection between the control system 318 and the electromechanical actuators 316, 322 may be provided by a communication line 324. The communication line 324 may be wired or wireless, or a combination thereof (e.g., for redundancy). The communication line 324 may be an electrical wire to supply electrical power from the control system 318 and an electromagnet of the first electromechanical actuator 316. It will be appreciated that in alternative configurations, the communication may be a wireless communication system, both for data/information and/or wireless power transfer. It will be appreciated that the overspeed safety system 300, in accordance with embodiments, can include any number of safety brakes, such as one, two, three, or more.

As shown, the control system 318 is located on the top or ceiling 308 of the car frame 304. However, such position is not to be limiting, and the control system 318 may be located anywhere within the elevator system (e.g., on or in the elevator car, within a controller room, etc.). The control system 318 may comprise electronics and printed circuit boards for processing (e.g., processor, memory, communication elements, electrical buss, etc.). Thus, the control system 318 may have a very low profile and may be installed within ceiling panels, wall panels, or even within a car operating panel of the elevator car 303. In other configurations, the control system 318 may be integrated into various of the components of the overspeed safety system 300 (e.g., within or part of the electromechanical actuator 316).

The overspeed safety system 300 is an electromechanical system that eliminates the need for a linkage or linking element installed at the top or bottom of the elevator car. The control system 318 may include, for example, a printed circuit board with multiple inputs and outputs. In some embodiments, the control system 318 may include circuitry for a system for control, protection, and/or monitoring based on one or more programmable electronic devices (e.g., power supplies, sensors, and other input devices, data highways and other communication paths, and actuators and other output devices, etc.). The control system 318 may further include various components to enable control in the event of a power outage (e.g., capacitor/battery, etc.). The control system 318 may also include an accelerometer or other component/device to determine a speed of an elevator car (e.g., optical sensors, laser range finders, induction sensors, mechanical sensors, wheel on a rail, etc.). In such embodiments, the control system 318 is mounted to the elevator car, as shown in the illustrative embodiments herein.

The control system 318, in some embodiments, may be connected to and/or in communication with a car positioning system, an accelerometer mounted to the car (i.e., a second or separate accelerometer), and/or to the elevator controller. Accordingly, the control system 318 may obtain movement information (e.g., speed, direction, acceleration) related to movement of the elevator car along an elevator shaft. The control system 318 may operate independently of other systems, other than potentially receiving movement information, to provide a safety feature to prevent overspeed events.

The control system 318 may process the movement information provided by a car positioning system to determine if an elevator car is traveling at a speed in excess of a threshold speed. If the threshold is exceeded, the control system 318 will trigger the electromechanical actuators and the safety brakes. The control system 318 will also provide feedback to the elevator control system about the status of the overspeed safety system 300 (e.g., normal operational position/triggered position). It will be appreciated that although referred to as an "overspeed" system, the systems may be configured to determine if an elevator car is accelerating at a rate in excess of a threshold acceleration, and the term "overspeed" is not to be limiting to merely a constant rate of motion.

Thus, the overspeed safety system 300 of the present disclosure enables electrical and electromechanical safety braking in the event of overspeed events. The electrical aspects of the present disclosure enable the elimination of the physical/mechanical linkages that have traditionally been employed in overspeed safety systems. That is, the electrical connections allow for simultaneous triggering of two separate safety brakes through electrical signals, rather than relying upon mechanical connections and other components such as wheels, ropes, etc.

With reference to FIG. 3C, details of parts of the overspeed safety system 300 are shown. The first electromechanical actuator 316 is mounted to the first car structural member 310 using one or more fasteners. The first electromechanical actuator 316 includes a magnet assembly 326 that is configured to magnetically engage with the guide rail 309. The first electromechanical actuator 316 is operably connected to the control system 318 by the communication line 324. The control system 318 can transmit an actuation signal to the first electromechanical actuator 316 (and the second electromechanical actuator 322) to perform an actuation operation when an overspeed event is detected. As used herein the term "overspeed event" refers to an event during which a speed, velocity, or acceleration of an elevator car exceeds a predetermined threshold of the respective state of motion, and is not intended to be limited to constant speed, but rather also includes rates of change (e.g., acceleration) and also direction of travel of motion the elevator car (e.g., velocity). The first electromechanical actuator 316 will actuate a connecting rod 332, by means of the magnet assembly 326 that is operably connected to the first safety brake 314. When the connecting rod 332 is actuated, the first safety brake 314 will actuate to engage with the guide rail 309, e.g., using a safety brake element 334, such as a safety roller or wedge. In some embodiments, the two-part illustrated configuration may be integrated into a single unit, thus potentially eliminating the connecting rod.

In accordance with embodiments of the present disclosure, portions of the overspeed safety system are bolted or other attachment means are used to fix the components to the upright. That is, the overspeed safety system in accordance with some embodiments of the present disclosure does not float within the upright, and it is not guided by the rail. For example, in normal operation, the overspeed safety system has no contact with the guide rail. Therefore, as the elevator car floats in the front-to-back direction, the components of the overspeed safety system (e.g., a housing) move with the elevator car and the magnet assembly is sometimes closer to the blade of the guide rail and sometimes farther from the guide rail. One advantage of such approach, in accordance with embodiments of the present disclosure, is that guiding elements are not needed, and therefore, the risk of noise from the guiding elements rubbing along the rail is eliminated. Similarly, for example, there is no risk of these guiding elements wearing because they are not included in the design.

Figure 4A:
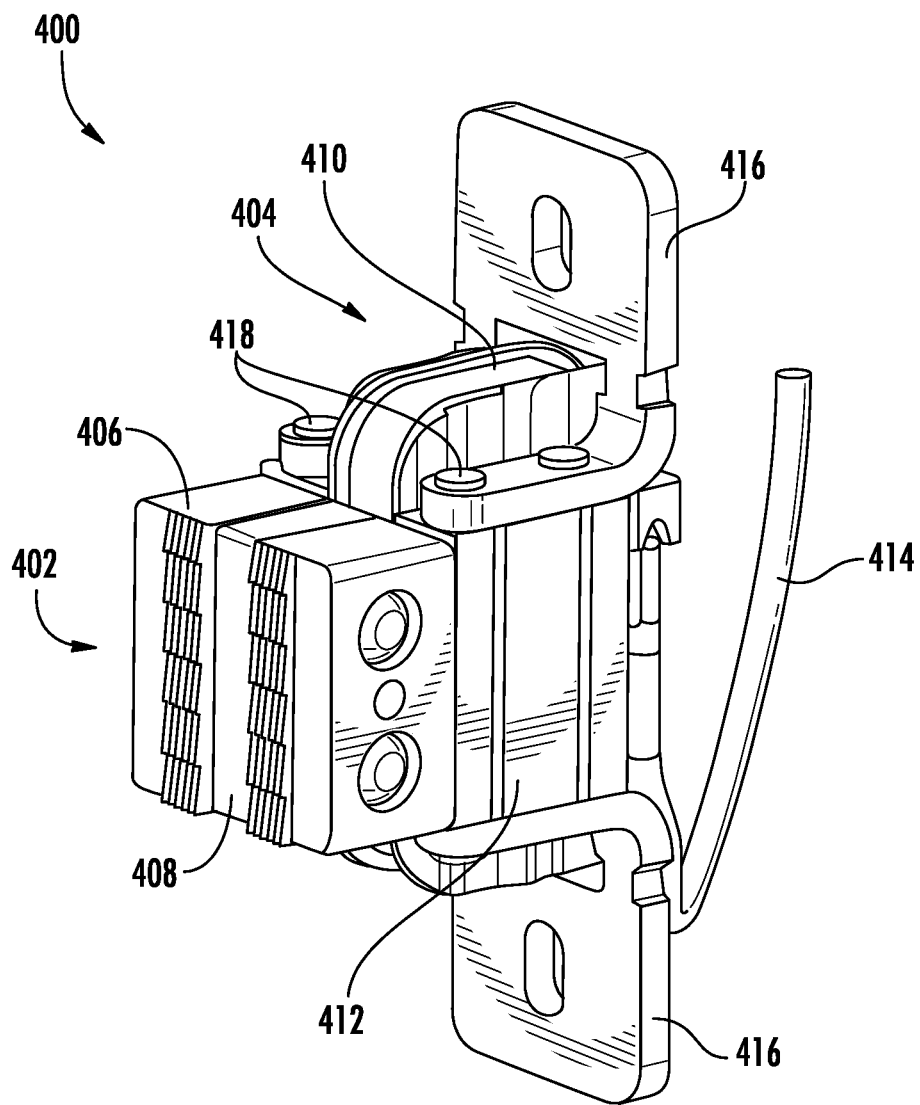
FIG. 4A is a schematic illustration of a portion of an electromagnet actuator that may incorporate embodiments of the present disclosure.
Figure 4B:
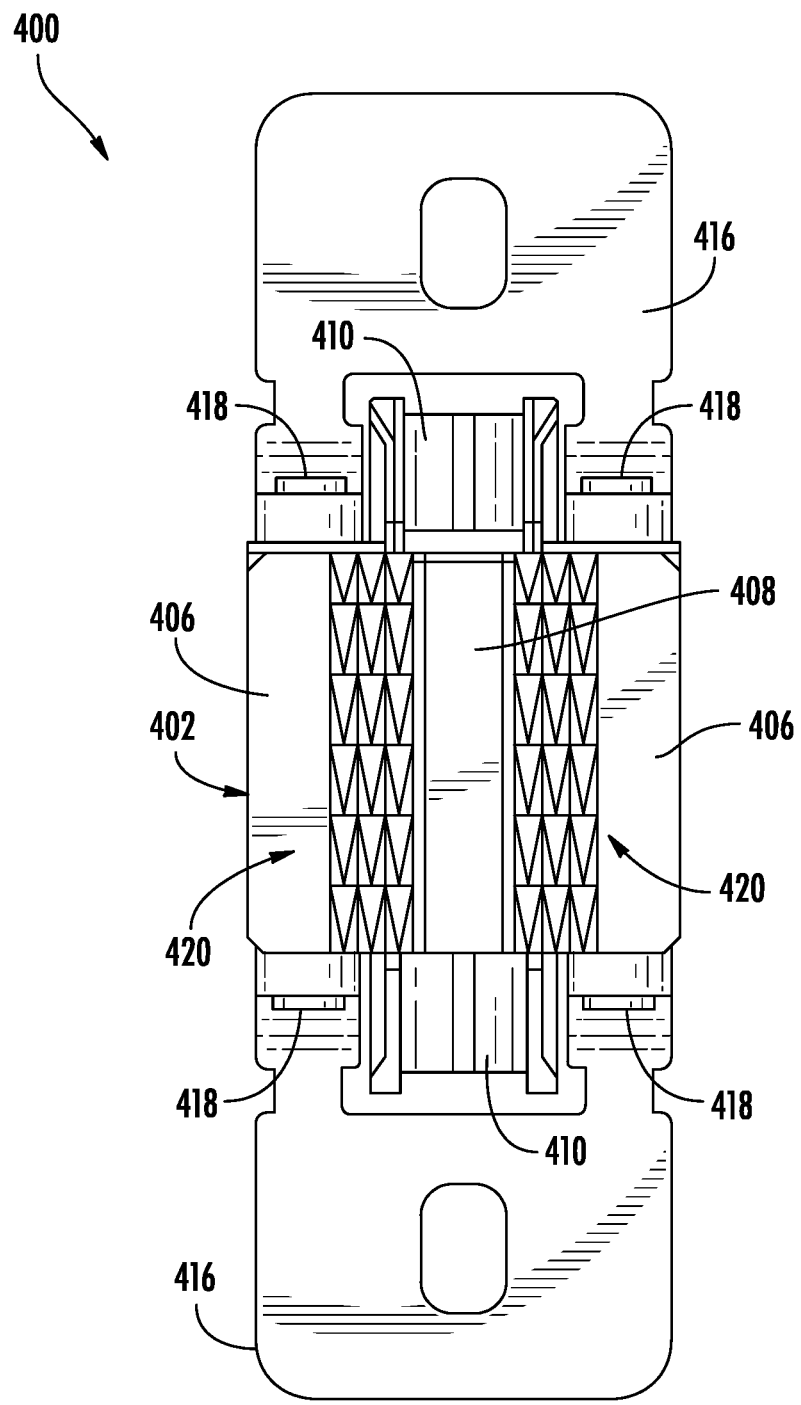
FIG. 4B is a front elevation view of the assembly shown in FIG. 4A.

Turning now to FIGS. 4A-4B, schematic illustrations of an electromagnet actuator 400 that may incorporate embodiments of the present disclosure is shown. The electromagnet actuator 400 may be a part of an electromechanical actuator, as shown and described above. The electromagnet actuator 400, as illustratively shown in this example embodiment, includes a magnet assembly 402 that is operably (and magnetically) connectable to an electromagnet assembly 404. The magnet assembly 402 includes optional rail engagement blocks 406 and a magnet 408 (e.g., a permanent magnet or other magnetic structure/device), and may be connected to a connecting rod (not shown), as will be appreciated by those of skill in the art, or directly connected to a safety brake in a single unit. The rail engagement blocks 406 provide for a contact structure or surface for engaging with a guide rail of an elevator system when the electromagnet actuator 400 is activated to provide a stopping or braking force. The rail engagement blocks 406 may, optionally, include teeth or friction surfaces. The teeth of the rail engagement blocks 406 are configured to grip into and frictionally engage with the guide rail such that a braking force is generated. A friction surface (e.g., a grit surface) may also provide similar braking force.

In this illustrative non-limiting configuration, the electromagnet assembly 404 includes a coil 410 arranged around a core 412 (e.g., formed from steel or steel plates). One or more lead wires 414 are electrically connected to the coil 410 to supply electricity thereto and thus generate a magnetic field by means of the coil 410 and the core 412. The coil 410 and the core 412 are located within a housing or other part of an elevator car (e.g., a frame) and movably mounted thereto (e.g., along springs or other biasing elements). The magnet 408 of the magnet assembly 402 is releasable from the electromagnet assembly 404 during a braking operation and thus cause a connecting rod to engage a safety brake of an elevator car. It will be appreciated that other configurations of electromagnetic assemblies may be employed without departing from the scope of the present disclosure (e.g., a one-piece safety configuration where the actuator is also the safety itself, with no need for a connecting rod). As shown, the coil 410 and the core 412 are mounted to a flange support 416 by one or more fasteners 418 (e.g., bolts). The biasing elements are configured to apply a biasing force against the flange support 416, as will be appreciated by those of skill in the art.

FIG. 4B illustrates a front elevation view, illustrating details of the magnet assembly 402. In particular, FIG. 4B illustrates the arrangement of teeth 420 of the rail engagement blocks 406. As shown, the teeth 420 are arranged in columns, and in particular, three columns of teeth 420 are provided on each rail engagement block 406. The teeth 420 are configured to provide a gripping or friction engagement with a guide rail during a braking operation. The teeth 420 will contact the material of the guide rail to generate a frictional braking force.

The illustration of FIG. 4B may be considered representative of a configuration of a rail engagement block. This configuration illustrates the inclusion of the three columns of teeth 420 which may be intentionally designed in view of operational, functional, and manufacturing considerations. The two primary considerations for formation and arrangement of the teeth are (i) maximizing the amount of tooth material (e.g., steel) in proximity to a guide rail so that a magnetic attraction of the magnetic to the guide rail can be maximized and (ii) minimizing the amount of tooth material that is actually in contact with the guide rail so that the pressures applied by the tips of the teeth can be high and the teeth can "cut into" the guide rail. That is, there is a balance between material frictional contact and magnetic contact between the magnet assembly and the guide rail to ensure a desired braking or stopping force to be generated. Alternative engagement features/surfaces may be used without departing from the scope of the present disclosure, including grit surfaces, textured surfaces, and the like.

Figure 5B:
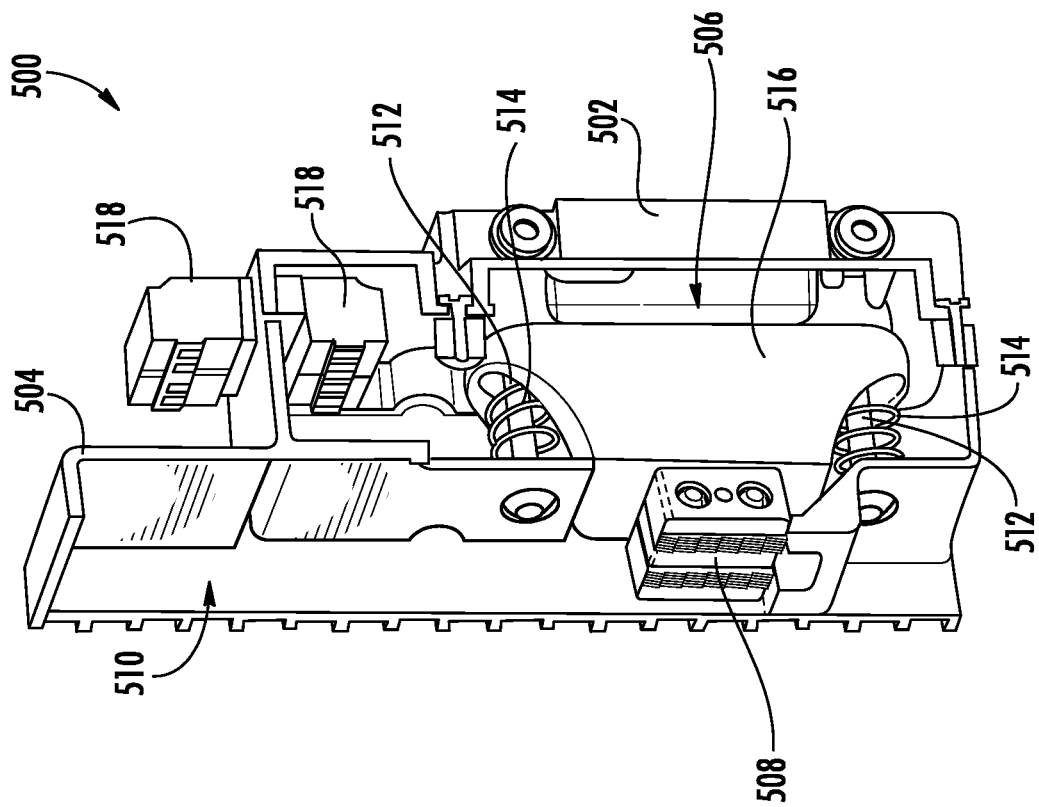
FIG. 5B is a partial cross-sectional illustration of the electromechanical actuator of FIG. 5A.
Figure 5A:
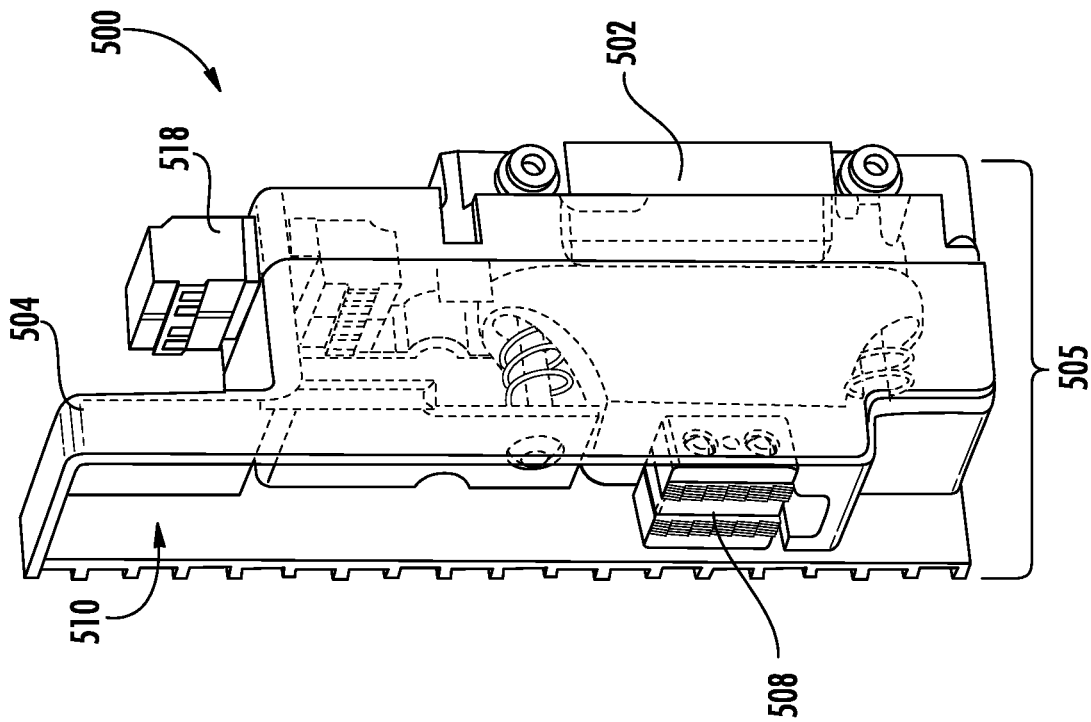
FIG. 5A is a schematic illustration of an electromechanical actuator that may incorporate embodiments of the present disclosure.

Turning now to FIGS. 5A-5B, schematic illustrations of an electromechanical actuator 500 that may incorporate embodiments of the present disclosure are shown. FIG. 5A illustrates an isometric illustration of the electromechanical actuator 500 and FIG. 5B is a partial cross-sectional view of the electromechanical actuator 500.

The electromechanical actuator 500 includes a first housing 502 and a second housing 504 that are fixedly connected together. Although shown, two separate housing components 502, 504 are configured to form a housing assembly 505. In alternative embodiments, the housing assembly 505 may be a single body, structure, or component that has substantially the same shape, structure, and configuration as the illustrative first and second housings 502, 504. The electromechanical actuator 500 further includes an electromagnet assembly 506 and a magnet assembly 508. As shown in FIG. 5B, the electromagnet assembly 506 may be housed between the first housing 502 and the second housing 504 and the magnet assembly 508 is housed within a track 510 defined by the second housing 504. In operation, the magnet assembly 508 may move along and within the track 510.

The electromagnet assembly 506 is a preformed structure that includes a coil and a core (e.g., laminated core, machined piece(s), etc.). Although shown and described as a laminated core, other core structures are possible without departing from the scope of the present disclosure. For example, in some embodiments, the core may be steel cores (e.g., formed from machined pieces) or ferrite cores. The electromagnet assembly 506 may be moveably mounted within the housing 502, 504 along one or more guides 512 and be biased to a rest position by one or more biasing elements 514 along the guides 512. Additionally, lead wires electrically connected to the coil of the electromagnet assembly 506 may be securely retained or installed within the unitary structure. The electromagnet assembly 506 includes an encapsulating body 516 which contains the components of the electromagnet assembly 506. The encapsulating body 516 may be, for example, a preformed body, a cast body, a molded structure, or a potted structure that has the components of the electromagnet assembly 506 embedded therein (e.g., coil, laminated core, lead wire, etc.). In some embodiments, the encapsulating body 516 may be preformed and the components installed therein and in other embodiments, the encapsulating body 516 may be formed around the components. The lead wire may electrically connect to an electrical connector 518. The electrical connector 518 may be fixedly attached to or mounted to the first housing 502 and can provide for electrical connection between the electromagnet assembly 506 and an electrical source of the control system (e.g., as shown and described above).

The first housing 502 is configured to be mounted to or affixed to a portion of an elevator car, such as a frame. The second housing 504 is configured to be a portion of the structure that is moveable along (e.g., adjacent or relative to) a guide rail of an elevator system. That is, the second housing 504 defines a portion of the electromechanical actuator 500 that is adjacent to or proximate the guide rail. This results in the magnet assembly 508 being arranged and retained within the track 510 of the second housing 504 between material of the first and/or second housing 502, 504 and the guide rail. It will be appreciated that the second housing 504 preferably does not contact the guide rail. That is, although the elevator car and electromechanical actuator 500 may float away from the guide rail (e.g., relative movement/motion), the dimensions of the magnet assembly 508 are such that the magnet assembly 508 never leaves the track 510.

As shown in FIGS. 5A-5B, the electromagnet assembly 506 is an encapsulated component of the electromechanical actuator 500. However, as described herein, other components, such as the magnet assembly 508 may be alternatively or additionally encapsulated.

Figure 6:
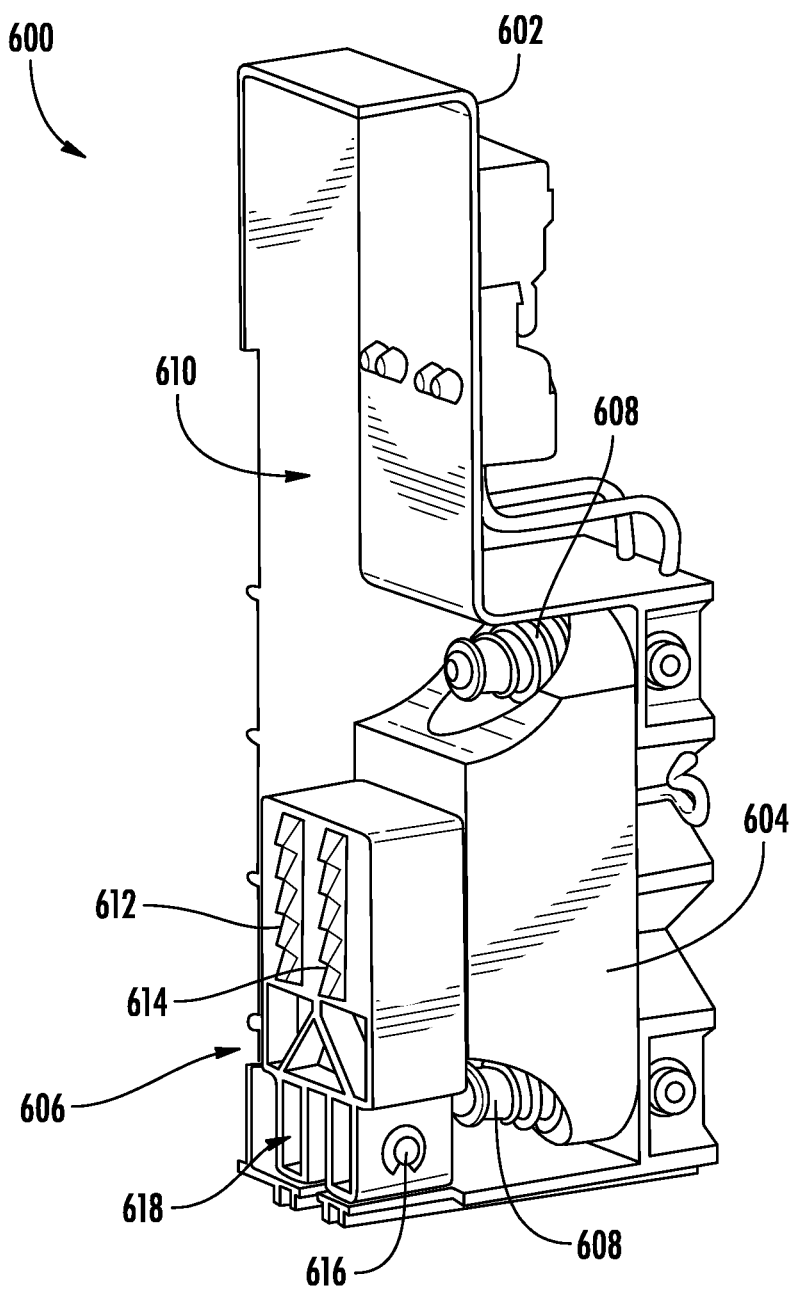
FIG. 6 is a schematic illustration of an electromechanical actuator that may incorporate embodiments of the present disclosure.

For example, turning now to FIG. 6, a schematic illustration of an electromechanical actuator 600 that may incorporate embodiments of the present disclosure is shown. The electromechanical actuator 600, as shown, includes a unitary formed housing 602 similar to that shown and described above (but in single-body form). The electromechanical actuator 600 includes an encapsulated electromagnet assembly 604 and an encapsulated magnet assembly 606. The encapsulated electromagnet assembly 604 is housed in a portion of the housing 602 and translatable or moveable along guides 608, similar to that described above. The encapsulated magnet assembly 606 is housed within a track 610 defined by a portion of the housing 602. In operation, the encapsulated magnet assembly 606 may move along and within the track 610.

Similar to the described encapsulated electromagnet assemblies described above, the components of the magnet assembly of the electromechanical actuator 600 are encased within a material to protect such components and improve part life. As shown, the encapsulated magnet assembly 606 includes an encapsulating body 612 that houses a magnet 614, which may include one or more rail engagement blocks. The encapsulating body 612 also houses a connector pin 616 that is configured to engage with a connecting rod to enable actuation of a safety brake when the encapsulated magnet assembly 606 moves upward along the track 610. The formation and structure of the encapsulated magnet assembly 606 may be substantially similar to that of the encapsulated electromagnet assemblies described above. That is, similar materials and/or manufacturing processes may be employed to form the encapsulated magnet assembly 606.

The connector pin 616 may be part of a component integrator 618 that allows for different locations/arrangements of connection to a connecting rod. Depending on a specific application and arrangement of parts (e.g., of the safety brake) some safeties lend themselves to lifting from the top of a wedge (e.g., most symmetric safeties) and others lend themselves to lifting from a face of a wedge (e.g., most asymmetric safeties). The preformed structure of the component integrator 618 permits different connection points to the connector pin 616, and thus enables greater versatility as compared to prior configurations.

The triggering of the electromechanical actuators may be by operation of a proximity switch target. The proximity switch target is configured to detect the location of the magnet assembly (e.g., on the electromechanical actuator as compared to engaged with a rail) by sensing a target (e.g., steel) that is arranged in proximity to the magnet assembly. In accordance with embodiments of the present disclosure, a proximity switch target is encapsulated within the encapsulated magnet assembly. For example, and without limitation, the proximity switch target may be installed or inserted using an injection molding process. In such processes, the components of the encapsulated magnet assembly and the proximity switch target are placed within a mold and plastic is injected into the mold in order to encapsulate the components and the proximity switch target within a single body.

Turning now to FIGS. 7A-7B, schematic illustrations of an electromechanical actuator 700 in accordance with an embodiment of the present disclosure are shown. The electromechanical actuator 700, as shown, includes a unitary formed housing 702. The electromechanical actuator 700 includes an encapsulated electromagnet assembly 704 and an encapsulated magnet assembly 706. The encapsulated electromagnet assembly 704 is housed in a portion of the housing 702 and translatable or moveable along guides 708. The encapsulated magnet assembly 706 is housed within a track 710 defined by a portion of the housing 702. In operation, the encapsulated magnet assembly 706 may move along and within the track 710.

The encapsulated magnet assembly 706 includes a component integrator 712 configured to enable connection between the encapsulated magnet assembly 706 and a connecting rod 714. The component integrator 712 includes a magnet assembly extension 716 and a connector pin 718. When the encapsulated magnet assembly 706 engages with a guide rail, the encapsulated magnet assembly 706 will cause actuation of the connecting rod 714 to in turn actuate a safety brake.

It may be required to know the state or position of the encapsulated magnet assembly 706 relative to the housing 702, a guide rail, and/or the encapsulated electromagnet assembly 704. To detect the position of the encapsulated magnet assembly 706, a proximity switch 720 may be mounted to or otherwise attached to one of the guides 708 of the housing 702. It will be appreciated that in other embodiments, the proximity switch may be attached or affixed in another location and/or to another component of the housing 702 and/or other part of the electromechanical actuator 700, and the configuration is provided for illustrative and explanatory purposes only. The proximity switch 720 has a fixed position relative to the housing 704 such that detection of a component moving relative to the proximity switch 720 may be detected.

In accordance with the present embodiment, the encapsulated magnet assembly 706 includes an encapsulated proximity switch target 722. The proximity switch target 722 may be a metallic component that may be magnetically detected (e.g., steel, aluminum, or other metals and/or materials). Further, proximity switch targets, in accordance with embodiments of the present disclosure, may have any geometric shape, but may, preferably, be cylindrical (e.g., puck or cylinder), although other shapes, such as squared, rectangular, circular, triangular, hexagonal, polygonal, etc., may be used without departing from the scope of the present disclosure. In other embodiments, as described herein, the proximity switch target may have a tab-like configuration. In accordance with embodiments of the present disclosure, the encapsulated proximity switch target 722 can achieve robustness because variation in the target location due to tolerances can be minimized. Further, by arranging the proximity switch target 722 at a location remote from, yet attached to the encapsulated magnet assembly 706, a separation between the metallic rail engagement blocks of the encapsulated magnet assembly 706 from the proximity switch target 722 may ensure that the magnetic field of the magnet of the encapsulated magnet assembly 706 does not influence an ability of the proximity switch 720 to detect the proximity switch target 722.

Figure 8C:
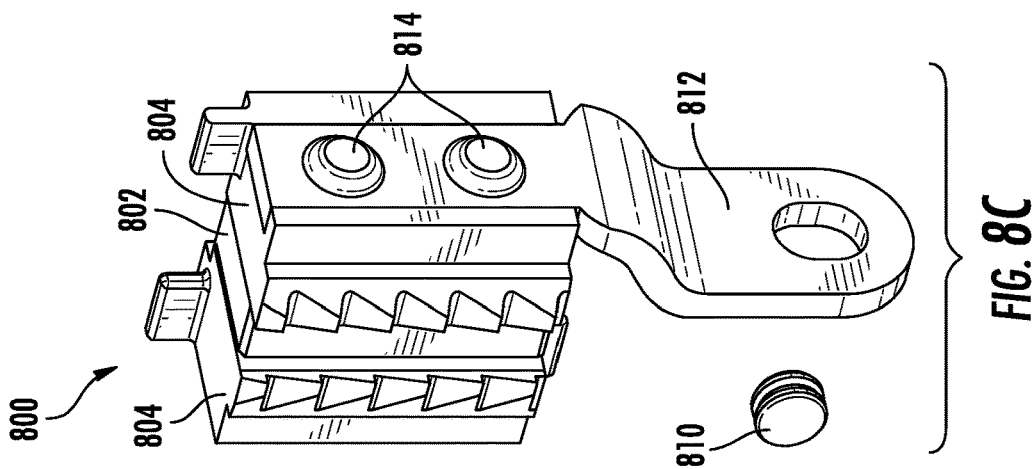
FIG. 8C is a schematic illustration of the encapsulated magnet assembly of FIG. 8A with an encapsulating body removed for illustrative purposes.
Figure 8B:
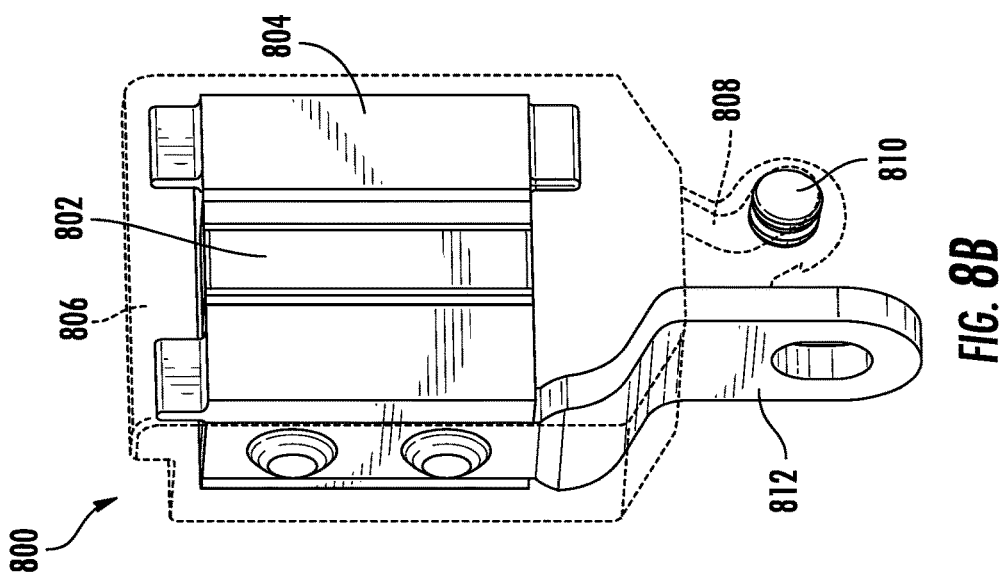
FIG. 8B is another view of the encapsulated magnet assembly of FIG. 8A.
Figure 8A:
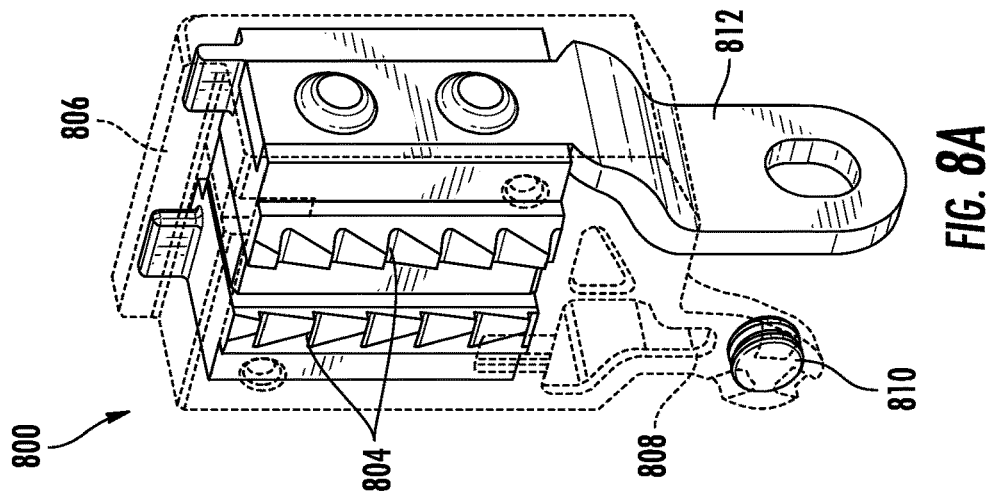
FIG. 8A is a schematic illustration of an encapsulated magnet assembly in accordance with an embodiment of the present disclosure.

Turning now to FIGS. 8A-8C, schematic illustrations of an encapsulated magnet assembly 800 in accordance with an embodiment of the present disclosure are shown. The encapsulated magnet assembly 800 includes a magnet 802 and rail engagement blocks 804 housed within an encapsulating body 806. The rail engagement blocks 804 may include teeth or friction surfaces, as will be appreciated by those of skill in the art. The encapsulating body 806 may be formed from plastic, thermoplastic, thermoset, epoxy, resin, and the like. The encapsulating body 806 is formed from a non-magnetic material to provide structural support and housing while minimizing interference with operation of an electromechanical actuator to which the encapsulated magnet assembly 800 may be a part.

FIGS. 8A-8B illustrate the encapsulated magnet assembly 800 as a complete component and FIG. 8C illustrates the components of the encapsulated magnet assembly 800 without the encapsulating body 806. The encapsulating body 806 includes a target extension 808 for supporting, retaining, or otherwise holding a proximity switch target 810. It is noted that, in some embodiments, the target extension 808 may be configured to removably attach or retain the proximity switch target 810. In other embodiments, the proximity switch target 810 may be permanently encapsulated within the material of the target extension 808. A magnet assembly extension 812 is attached to the encapsulated magnet assembly 800 by one or more fasteners 814. The fasteners 814 may securely affix the magnet assembly extension 812, the rail engagement blocks 804 and the magnet 802 together. The magnet assembly extension 812 is configured to connect to a connecting rod that, in turn, is connected to a safety brake to enable actuation of the safety brake, as described above.

The target extension 808 of the encapsulating body 806 is sized, shaped, and configured to position the proximity switch target 810 relative to the rest of the components of the encapsulated magnet assembly 800 in addition to positioning it relative to a proximity switch of an electromechanical actuator, such as shown in FIGS. 7A-7B. A length of the target extension 808 is selected to ensure that the magnet 802 does not interfere with operation of the proximity switch interacting with the proximity switch target 810. In some non-limiting embodiments, the length of the target extension may be set to a minimum of about 10 mm from the magnet, although other separation distances may be used without departing from the scope of the present disclosure. For example, in some embodiments, the proximity switch target may be positioned closer than 10 mm from the magnet, and in other embodiments, the separation distance may be larger than 10 mm, such as 20 mm, 50 mm, or even 100 mm or greater.

Turning now to FIGS. 9A-9B, schematic illustrations of an encapsulated magnet assembly 900 in accordance with an embodiment of the present disclosure are shown. The encapsulated magnet assembly 900 includes a magnet 902 and rail engagement blocks 904 housed within an encapsulating body 906. The encapsulating body 906 includes a component integrator 908 that provides for a target extension similar to that described above, for supporting, retaining, or otherwise holding a proximity switch target 910. In this embodiment, the connection with a connecting rod is provided by a connecting pin 912 that is housed within the component integrator 908. Similar to that described above, the proximity switch target 910 is retained at a fixed position relative to the rest of the encapsulated magnet assembly 900 within the component integrator 908. As such, a target extension in this embodiment is provided by the component integrator 908, or stated another way, the component integrator 908 in this embodiment includes the target extension described above. The encapsulating body 906 is formed of non-magnetic material that is formed and arranged to reduce, minimize, and/or eliminate magnetic interference with operation of a proximity switch and the proximity switch target 910.

Figure 10:
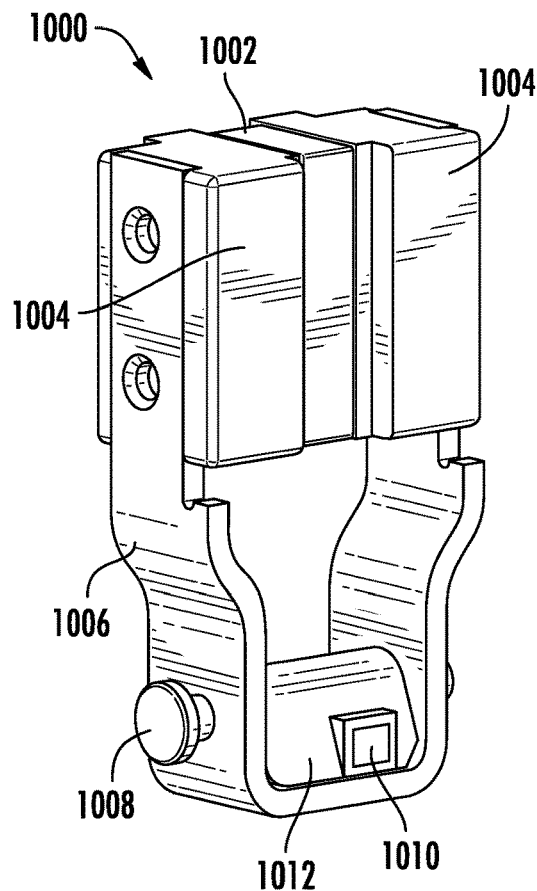
FIG. 10 is a schematic illustration of a magnet assembly in accordance with an embodiment of the present disclosure.

Turning now to FIG. 10, an alternative configuration of a magnet assembly 1000 in accordance with an embodiment of the present disclosure is shown. The magnet assembly 1000 can be encapsulated with an encapsulating body, although such feature is not show for clarity. The magnet assembly 1000 includes a magnet 1002, rail engagement blocks 1004, and a component integrator 1006. The component integrator 1006 is configured to attach a connector pin 1008 and a proximity switch target 1010 to the magnet assembly 1000. In this configuration, the proximity switch target 1010 is housed within a target housing 1012 to provide magnetic insulation from the metal of the magnet assembly 1000.

Figure 11:
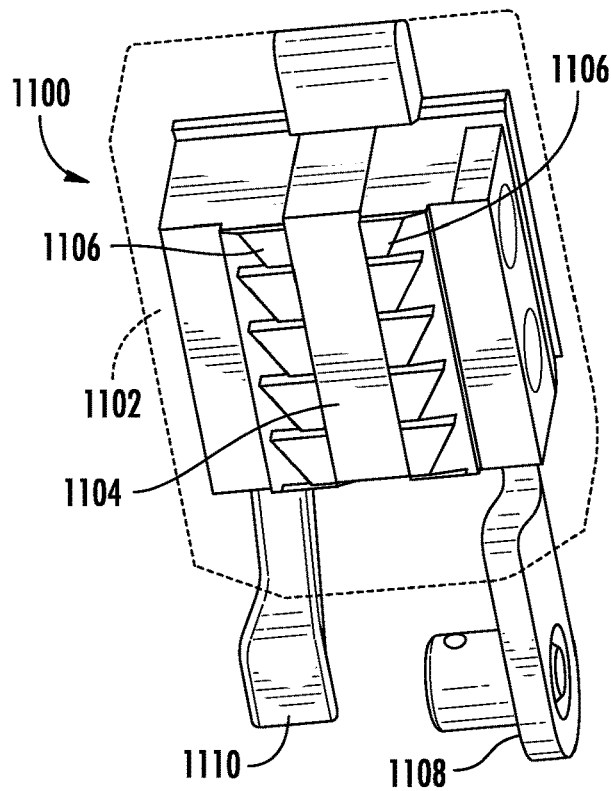
FIG. 11 is a schematic illustration of an encapsulated magnet assembly in accordance with an embodiment of the present disclosure.

Turning now to FIG. 11, an alternative configuration of a magnet assembly 1100 in accordance with an embodiment of the present disclosure is shown. The magnet assembly 1100 includes an encapsulating body 1102 having a magnet 1104, rail engagement blocks 1106, and a magnet assembly extension 1108 for connecting to a connecting rod. A proximity switch target 1110 extends from the magnet assembly 1100, and in this configuration is a tab-like structure or part.

Figure 12:
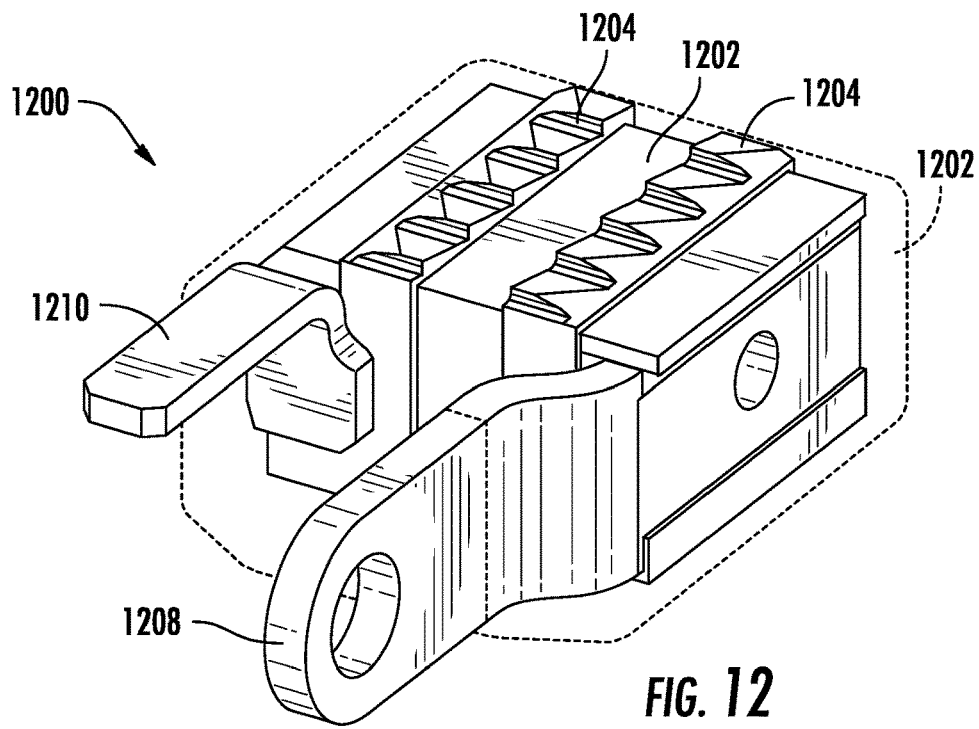
FIG. 12 is a schematic illustration of an encapsulated magnet assembly in accordance with an embodiment of the present disclosure.

FIG. 12 illustrates an alternative tab-style configuration of a magnet assembly 1200. The magnet assembly 1200 includes an encapsulating body 1202 having a magnet 1204, rail engagement blocks 1206, and a magnet assembly extension 1208 for connecting to a connecting rod. A proximity switch target 1210 extends from the magnet assembly 1200, and in this configuration is a tab-like structure or part.

In each of the above described embodiments, and in accordance with embodiments of the present disclosure, a proximity switch target is fixedly attached or connected to a magnet assembly in order to position the proximity switch target relative to the components thereof. The position of the proximity switch target is selected for detection by a proximity switch of an electromechanical actuator and to minimize or prevent interference from other metallic and/or magnetic components.

Accordingly, in accordance with embodiments of the present disclosure, electromechanical systems may incorporate one or more improved magnet assemblies, as shown and described above. Embodiments of the present disclosure provide for targets to be detected by proximity switches of electromechanical actuators. The targets may be encapsulated within plastic or other non-magnetic materials to achieve robustness with respect to target location, tolerances, and the like. Further, embodiments of the present disclosure can minimize or eliminate magnetic interference from magnetic components of the magnet assemblies by separating the position of the target relative to the rail engagement blocks and/or magnet while maintaining the target in a fixed position relative to the magnet assembly.

The terminology used herein is for the purpose of describing particular embodiments only and is not intended to be limiting of the present disclosure. The terms "about" and "substantially" are intended to include the degree of error associated with measurement of the particular quantity and/ or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A magnet assembly of an electromechanical assembly for an elevator system, the magnet assembly comprising:
   a magnet;
   at least one rail engagement block;
   an encapsulating body encapsulating the magnet and the at least one rail engagement block, wherein the encapsulating body is formed from a non-magnetic material;
   a target extension formed from the material of the encapsulating body and extending away from the magnet and the at least one rail engagement block; and
   a proximity switch target held within the target extension.

2. The magnet assembly of claim 1, wherein the non-magnetic material of the encapsulating body is plastic.

3. The magnet assembly of claim 1, wherein the at least one rail engagement block is two rail engagement blocks arranged on opposite sides of the magnet.

4. The magnet assembly of claim 1, wherein the at least one rail engagement block comprises a plurality of teeth.

5. The magnet assembly of claim 1, further comprising a magnet assembly extension configured to operably connect to a connecting rod of an electromechanical actuator.

6. The magnet assembly of claim 5, further comprising at least one fastener configured to attach the magnet assembly extension to the at least one rail engagement block.

7. The magnet assembly of claim 1, wherein the target extension is configured to position the proximity switch target at least 10 mm from the magnet.

8. The magnet assembly of claim 1, wherein the proximity switch target is formed from steel.

9. The magnet assembly of claim 1, further comprising a connector pin configured to engage with a connecting rod to enable actuation of a safety brake.

10. The magnet assembly of claim 9, wherein the connector pin is housed within the encapsulating body.

11. An electromechanical actuator of an elevator system, the electromechanical actuator comprising:
   a housing;
   an electromagnet assembly moveably mounted within the housing; and a magnet assembly moveably mounted within the housing and configured to magnetically engage and disengage from the electromagnet assembly;

wherein the magnet assembly comprises:

a magnet;

at least one rail engagement block;

an encapsulating body encapsulating the magnet and the at least one rail engagement block, wherein the encapsulating body is formed from a non-magnetic material;

a target extension formed from the material of the encapsulating body and extending away from the magnet and the at least one rail engagement block; and a proximity switch target held within the target extension.

12. The electromechanical actuator of claim 11, wherein the non-magnetic material of the encapsulating body is plastic.

13. The electromechanical actuator of claim 11, wherein the at least one rail engagement block is two rail engagement blocks arranged on opposite sides of the magnet.

14. The electromechanical actuator of claim 11, wherein the at least one rail engagement block comprises a plurality of teeth.

15. The electromechanical actuator of claim 11, further comprising a magnet assembly extension configured to operably connect to a connecting rod of an electromechanical actuator.

16. The electromechanical actuator of claim 15, further comprising at least one fastener configured to attach the magnet assembly extension to the at least one rail engagement block.

17. The electromechanical actuator of claim 15, further comprising a connecting rod attached to the magnet assembly extension at a first end and a safety brake at a second end.

18. The electromechanical actuator of claim 11, further comprising at least one guide, wherein the electromagnet assembly is moveably mounted on the at least one guide.

19. The electromechanical actuator of claim 11, further comprising a proximity switch, wherein the proximity switch is mounted on an end of the at least one guide and wherein the proximity switch is configured to detect the presence of the proximity switch target.

20. The electromechanical actuator of claim 11, further comprising a proximity switch fixedly positioned within the housing and wherein the proximity switch is configured to detect the presence of the proximity switch target.

\* \* \* \* \*